United States Patent [19]
Ngo

[11] 3,967,267
[45] June 29, 1976

[54] LIGHT PEN DETECTION FOR PLASMA PANELS USING SPECIALLY TIMED SCANNING ADDRESS PULSES

[75] Inventor: Peter Dinh-Tuan Ngo, Colts Neck, N.J.

[73] Assignee: Bell Telephone Laboratories, Incorporated, Murray Hill, N.J.

[22] Filed: Oct. 9, 1974

[21] Appl. No.: 513,475

[52] U.S. Cl. ............................ 340/324 M; 178/19; 315/169 TV; 340/343
[51] Int. Cl.² ............................................ G06F 3/14
[58] Field of Search ........... 340/324 R, 324 M, 343; 178/18, 19; 315/169 TV

[56] References Cited
UNITED STATES PATENTS

| | | | |
|---|---|---|---|
| 3,651,509 | 3/1972 | Ngo.................................. | 340/324 R |
| 3,832,693 | 8/1974 | Ishizaki et al......................... | 178/19 |
| 3,851,327 | 11/1974 | Ngo................................ | 340/324 M |
| 3,875,472 | 4/1975 | Schermerhorn................ | 340/324 M |

Primary Examiner—Marshall M. Curtis
Attorney, Agent, or Firm—William Ryan; Ronald D. Slusky

[57] ABSTRACT

An enhanced light pen capability is provided in plasma display panels by applying specially timed write and erase pulses in a scanning manner over the panel, the pulses being shaped and positioned relative to the normal sustain pulse sequence in such manner that a light pulse is emitted upon the resulting momentary write or erase which is detected by a light pen of standard design while avoiding any but transient modification to the state of the cell wall capacitance. The scanned write pulses advantageously assume the form of modified write pulses with shortened duration and less abrupt terminations than is usual. Dynamic keep-alive circuitry for applying location-dependent priming enhances the operating margins to permit reliable, constant-voltage write and erase signals for all cell locations.

17 Claims, 9 Drawing Figures

LIGHT PEN DETECTION FOR PLASMA PANELS USING SPECIALLY TIMED SCANNING ADDRESS PULSES

BACKGROUND OF THE INVENTION

1. Field of the Invention

The present invention relates to display systems for use in cooperation with a computer or similar control system. The present invention further relates to means for adding a light pen capability to an existing display system under the control of a computer or similar control system.

2. Description of the Prior Art

Plasma display systems which rely on light emitted from an array of individual plasma discharge cells are now well known in the art. For example, U.S. Pat. No. 3,559,190 issued Jan. 26, 1971 to Bitzer et al. describes an early development in the field. In some respects plasma display panels are similar to well known cathode ray display systems such as those described in U.S. Pat. No. 3,653,001 issued Mar. 28, 1972 to W. H. Ninke and U.S. Pat. No. 3,389,404 issued June 18, 1968 to R. A. Koster. An important difference, however, between plasma display systems and CRT-based systems is that plasma displays have inherent memory, i.e., they need not be constantly refreshed by an information bearing sequence corresponding to the desired visual image. Thus, once a pattern of "on" and "off" cells is established, plasma display systems require only that there be applied to each on cell on a periodic basis a sustain signal to renew the discharge at operating cells or crosspoints. This sustain signal is not itself sufficient to cause breakdown. However, when breakdown has previously existed such pulses will cause the discharge to be maintained.

A useful adjunct of any computer-based display system is a so-called light pen for communicating to a computer or other control mechanism a location on the display surface. In typical CRT display systems, such as systems described in the Ninke and Koster patents, supra, a light pen is sensitive to the application of signals by the computer or similar device to the CRT. The computer then correlates the detection of the resulting light pulse and information stored internally relating to the refresh data causing the light to be emitted.

Because reference to the picture information is not always immediately available to the control computer for purposes of correlation as in CRT systems (because the information need not be available for refresh purposes), plasma display systems have used a slightly different arrangement. In general, a separate scanned pulse is used to generate a corresponding identifiable light pulse which can be detected by the light pen. For example, in accordance with my earlier invention described in U.S. Pat. No. 3,651,509 issued Mar. 21, 1972 I provide a system for effectively combining a light pen with a plasma display system. It will be noted, however, that the system described in this earlier patent requires the addition of a moderate amount of special purpose circuitry. Further, for some applications operating margins are found to be less than optimum.

My copending application Ser. No. 345,893 filed Mar. 29, 1973 now U.S. Pat. No. 3,851,327 issued Nov. 26, 1974 describes a light pen detection system using a specially timed scanning erase pulse to "flash" each on cell in a plasma panel. Because of the special timing of the resulting light pulse, it is possible to uniquely identify a given on cell using a standard light pen and simple logic circuitry. Because of the inherent memory in a plasma display cell, a scanned erase pulse does not sufficiently discharge the cell before the normal sustain signals arrive to again restore the normal charge distribution. It should be clear, however, that the system described in the last-mentioned patent application is not appropriate for detecting the location of a light pen in a position adjacent only off cells.

It is therefore an object of the present invention to provide means for identifying a particular on or off cell in a plasma panel array using a standard light pen.

An important limitation in using standard plasma panels for light pen detection and similar techniques is the typically narrow operating margins for address and sustain signals. Thus, for example, in connection with the light pen detection system described in my previous application Ser. No. 345,893 filed Mar. 29, 1973, and in my earlier invention described in U.S. Pat. No. 3,651,509, some care must be exercised in the choice of addressing pulse amplitude, duration and shape to insure that spurious writing and erasing of unselected cells does not occur.

It is therefore a further object of the present invention to improve operating margins for scanning pulses in a light pen detection system.

SUMMARY OF THE INVENTION

The present invention, in preferred embodiment, includes means for generating and applying specially timed write and erase pulses to all, or a selected subset of, cells in an otherwise standard plasma panel array. A scanning erase pulse operates in a manner substantially similar to that described in my copending application Ser. No. 345,893, while the scanning write pulse is effective to momentarily flash all, or some selected set of, off cells in the array. Both the scanning write and erase pulses are shaped and positioned in time relative to the normal sustain signals so that the normal memory state (off or on) is not disturbed except momentarily. Operating margins necessary to permit the selection of desirable write and erase pulses is achieved through the use of dynamic keep-alive circuitry based on that described in my copending application Ser. No. 460,757 filed Apr. 15, 1974.

Illustrative circuitry for accomplishing the above scanning functions is disclosed, as are typical applications for systems including these functions.

DETAILED DESCRIPTION

Basic Device Characteristics

Before discussing the improvements resulting from the present invention, it is considered advisable to briefly review typical prior art plasma display systems. The above-cited Bitzer et al. patent, and the paper by Johnson and Schmersal, "A Quarter-Million-Element AC Plasma Display With Memory," *Proceedings of the Society for Information Display*, Vol. 13, No. 1, First Quarter 1972 (and other articles in that issue) provide a useful summary of such systems.

Structurally, plasma display panels are rectangular arrays of gas discharge cells, which cells are separated from orthogonal exciting electrodes by layers of dielectric material. In the most basic application of the device, i.e., a two-level digital display, the entire array of elements is excited by an alternating (or bipolar pulse) signal which, by itself is of insufficient magnitude to ignite gas discharges in any of the elements. If, however, the walls of an element are appropriately charged, as a result of a previous discharge, the voltage across the element will be augmented, and a new discharge can be ignited. Electrons and ions again flow to the dielectric walls extinguishing the discharge and establishing a reverse field. On the following half cycle the field thus established again augments the external (now opposite polarity) voltage and makes possible another discharge in the opposite direction. In this way a sequence of electrical discharges, once started, can be sustained by an alternating voltage signal, that, by itself, could not initiate that sequence.

Typically, elements of a plasma array in the "0" or OFF state are characterized by the absence of a discharge sequence and therefore the absence of light output from those elements. Elements in the "1" or ON state are characterized by pulse discharges and associated light pulses occurring once during each half cycle of the exciting voltage. The stability characteristics and non-linear switching properties of these bistable elements are such that the state of any element in the array can be changed by selective application of coincident address voltages to the appropriate electrodes. The address voltages, by controlling discharge intensity, accomplish selective state changes by perturbing only the wall voltage of the element being addressed.

Figure 1:
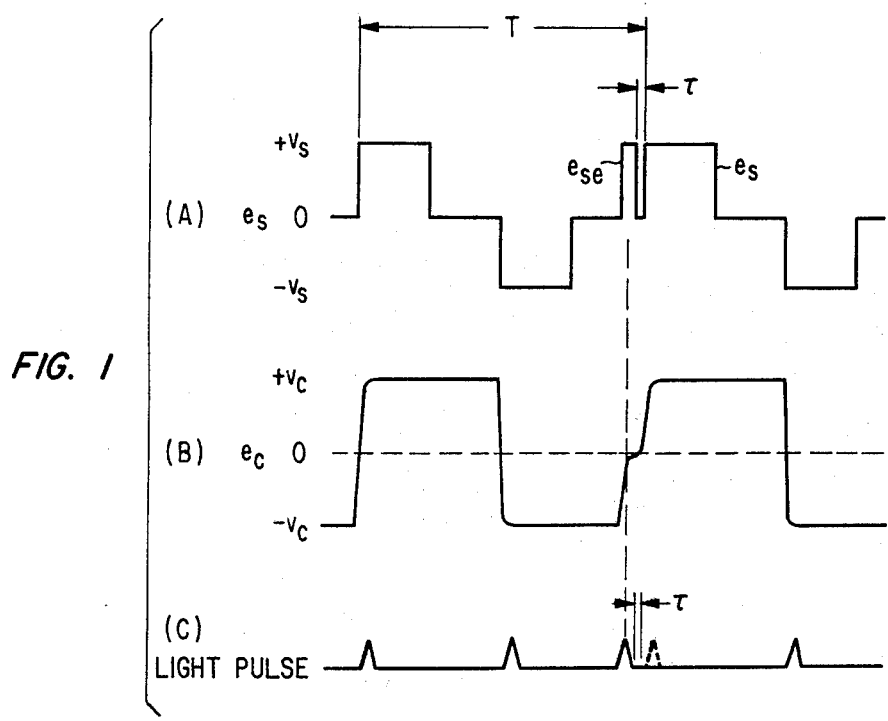
FIG. 1 summarizes the timing and effect on cell voltage and emitted light pulses of a scanning erase pulse in accordance with my earlier invention.

FIG. 1 illustrates a typical sustain signal waveform suitable for application to cells in a plasma display panel. During each T-second sustain cycle shown in waveform A, a bipolar pulse sequence applied to an on cell gives rise to a cell capacitance voltage varying as shown at the left of waveform B, and to the first two light pulses shown in waveform C.

A scanning erase pulse applied $\tau$ seconds prior to the appearance of a positive excursion of the sustain signals has the effect of generating the third light pulse shown in waveform C. The application of this scanning erase pulse and the utilization of it in a plasma panel/light pen system is described in my copending U.S. patent application, Ser. No. 345,893, filed Mar. 29, 1973, which application is hereby incorporated by reference. For the present disclosure, therefore, it is sufficient to note that the proximity of the scanned erase pulse to the following sustain pulse is such that the charge stored in the cell capacitance is not completely depleted by the erase flashing. That is, the sustain pulse follows the scanned erase pulse sufficiently closely that the remaining cell voltage then added to the sustain signal restores substantially all of the charge that was depleted. In subsequent half cycles, therefore, normal discharges occur as before; this is denoted by the final light pulse on line C in FIG. 1. If a normal erase pulse, occurring earlier than $\tau$ seconds prior to the following sustain pulse, had been applied to an on cell, the cell capacitance would have been depleted to a point such that recovery of cell charge would not be possible. Thus a true erase would have taken place.

The overall effect of the scanning erase pulse is to generate a uniquely timed light pulse, while disturbing the state of on cells only very briefly. The charge state of off cells is not disturbed at all. In fact because the erase pulse (scanning or otherwise) is of a magnitude approximating a sustain signal, no light pulse is emitted by off cells when an erase pulse is applied.

SCANNING WRITE PULSE

Because of the last-cited limitation to flashing only on cells, applicability of the scanned erase pulse techniques is not appropriate for some applications. Thus, for example, a common application of light pen interaction involves pointing and drawing on a display device. Using the basic scanned erase technique on a plasma panel limits pointing to those cells which are in the on state. Thus, for example, if a pointing (and detection) operation is followed by a true erase, it is possible to write a dark-on-light image on a plasma panel. No light-on-dark operation is possible using the scanned erase technique, because no pointing is possible with respect to off cells.

To overcome these limitations, the present invention introduces an additional scanning pulse related to the normal write pulse. To appreciate the operation of this "scanned write" pulse, it proves convenient to review the operation of a normal write sequence.

Figure 2:
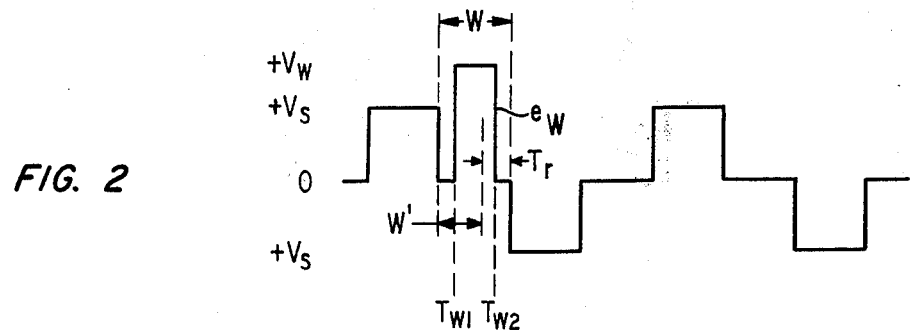
FIG. 2 illustrates typical prior art write and sustain sequences.

FIG. 2 illustrates the typical magnitude and timing of a normal write pulse $e_w$ relative to a normal sustain signal. It will be recognized that $e_w$ has magnitude $V_w$, a level greater than the magnitude, $V_s$, of the sustain signal. Since the write pulse is intended to alter the memory state of a cell, its duration is longer (typically 3–5 $\mu$sec, depending on cell geometry and gas composition and pressure) than an erase pulse. Further, the placement of the write pulse must be such that it precedes a sustain pulse of opposite polarity by a period not exceeding the memory recovery time, $T_r$, of the cell. Thus, while the write pulse may appear within the "window" W in FIG. 2, it must not be wholly confined to the smaller window, W', ending $T_r$ seconds prior to the following sustain pulse. With a pulse like that shown as $e_w$ in FIG. 2, a light pulse is generated, and sufficient charge is deposited so that the following negative sustain signal adds to the voltage associated with the deposited charge to again cause a gas discharge. The cell has been established in the on state.

From the above brief summary of the write operation, a first requirement for a scanned write pulse appears: while causing a breakdown at an off cell, it must not deposit enough charge so that a following sustain pulse will establish the off cell in the on state. This charge deposition limitation could, theoretically, be achieved by lowering the voltage of a scanned write pulse to a lower level. If lowered too much, however, the scanned write pulse will fail to cause the desired cell flashing. Further, and perhaps most importantly, existing plasma panels are often very critically adjusted. The magnitude of a pulse that will consistently write over any desired location on a panel while avoiding writing at other than the desired location typically can vary over only a quite narrow range.

It also might appear possible to locate a scanning write pulse at a point preceding a sustain pulse of the same polarity. Such a positioning alone, however, would establish a charge which would oppose the succeeding sustain pulse and therefore cause an extinction of the discharge at an on cell. Since in general, there is no apriori knowledge to whether a cell is on of off, spurious erasing would be caused by such a scanning write pulse. Further, a detected light pulse would not indicate whether the cell at which the light pulse originated was on or off.

Figure 3:
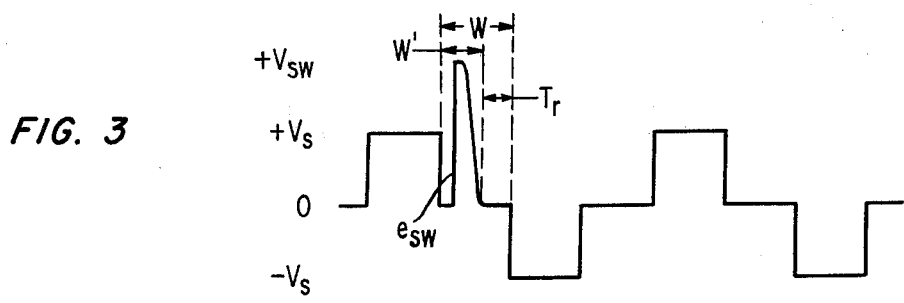
FIG. 3 illustrates a modification to the normal write pulse in accordance with one aspect of the present invention.

A preferred choice for a scanning write pulse in accordance with one aspect of the present invention is illustrated in FIG. 3. There, a scanning write pulse, $e_{sw}$, is shown within the window W' previously identified in connection with FIG. 2. Note that $e_{sw}$ begins at substantially the same time in the sustain cycle as a normal write pulse, but that it terminates at least $T_r$ seconds prior to the onset of the following sustain pulse. Note also that the trailing edge of $e_{sw}$ has been shaped to fall more gradually than a normal write pulse. This shaping has been found experimentally to reduce the memory effect in a scan-written cell, thereby avoiding still further the possibility of inadvertent "permanent" writing of an off cell.

The scanned write pulse, $e_{sw}$, in FIG. 3 will be seen to have a polarity which is opposite to the cell memory voltage of a scanned cell which is in the on state. This follows because the immediately preceding positive sustain signal causes a discharge and a cell capacitance voltage tending to oppose such a discharge. The final result of the capacitance cell charging is intended to be added to the next following (negative) sustain pulse to again cause a discharge. When, however, $e_{sw}$ is interposed between the sustain pulses as shown in FIG. 3, and the composite applied to an on cell, the stored voltage opposes $e_{sw}$, thereby preventing a flashing of the on cell.

Though the peak amplitude of $e_{sw}$ in FIG. 3 is shown as substantially equal to that of the normal write pulse $e_w$ shown in FIG. 2, experiments have indicated that in using otherwise standard panel operation (including sharp pulse shaping), a greater amplitude is sometimes required for $e_{sw}$ to reliably perform its intended flashing function. Thus some centrally located cells in larger plasma panels, e.g., a 512 × 512 cell panel, sometimes fail to reliably flash upon being scanned by $e_{sw}$. The amplitude for $e_{sw}$ can, of course, be increased to ensure that all cells flash when scanned, but this introduces the possibility that the scanned off cell (or other off cells) may inadvertently be established in the on condition.

DYNAMIC KEEP-ALIVE

To permit a lowered, more uniform scanning write pulse, it proves convenient to introduce a dynamic keep-alive mode of panel operation of the type described in my copending U.S. patent application Ser. No. 460,757 filed Apr. 15, 1974, which application is hereby incorporated by reference. Thus it is recognized that cells more remote from the priming or keep-alive cells profit from a shorter relative separation as between address (erase or write) pulses and keep-alive cell firing than do cells more proximate the keep-alive cells. Using such dynamic keep-alive operation, it has been found possible to use a maximum magnitude for $e_{sw}$ which is substantially equal to that for the normal write pulse $e_w$. In fact, as will be described below, it proves convenient to merely modify the normal write pulse by changing its duration (but not its beginning), and its shape in generating $e_{sw}$.

COMBINED SCANNED ERASE AND SCANNED WRITE

Figure 4:
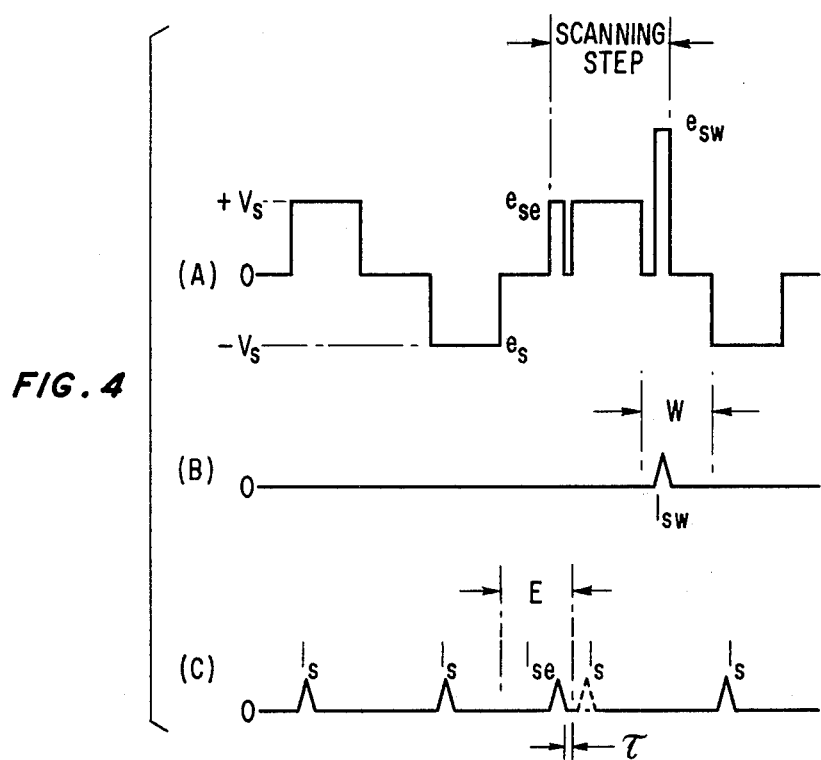
FIG. 4 illustrates a composite waveform including both a scanning write pulse and a scanning erase pulse, as well as light pulses resulting from the application of the composite waveform to off and on cells.

To render a light pen useful as a completely unrestrained pointing tool in connection with a plasma display panel it remains only to combine the scanned erase and scanned write pulses in a single waveform. Such a signal is illustrated in FIG. 4. Thus in a single "scanning step" both a scanned write pulse $e_{sw}$ and a scanned erase pulse $e_{se}$ are advantageously superimposed on a normal sustain signal as shown in waveform A in FIG. 4. Waveform B illustrates the timing of a light pulse emitted by an off cell (resulting from a scanned write) and waveform C illustrates the timing of the light pulses emitted by an on cell (resulting from normal sustain signals and a scanned erase). The dash-line representation appearing after the third light pulse in waveform C shows the timing of an omitted light pulse after the erase but before the full memory has been restored.

CONTROL AND DRIVE CIRCUITRY

Figure 5:
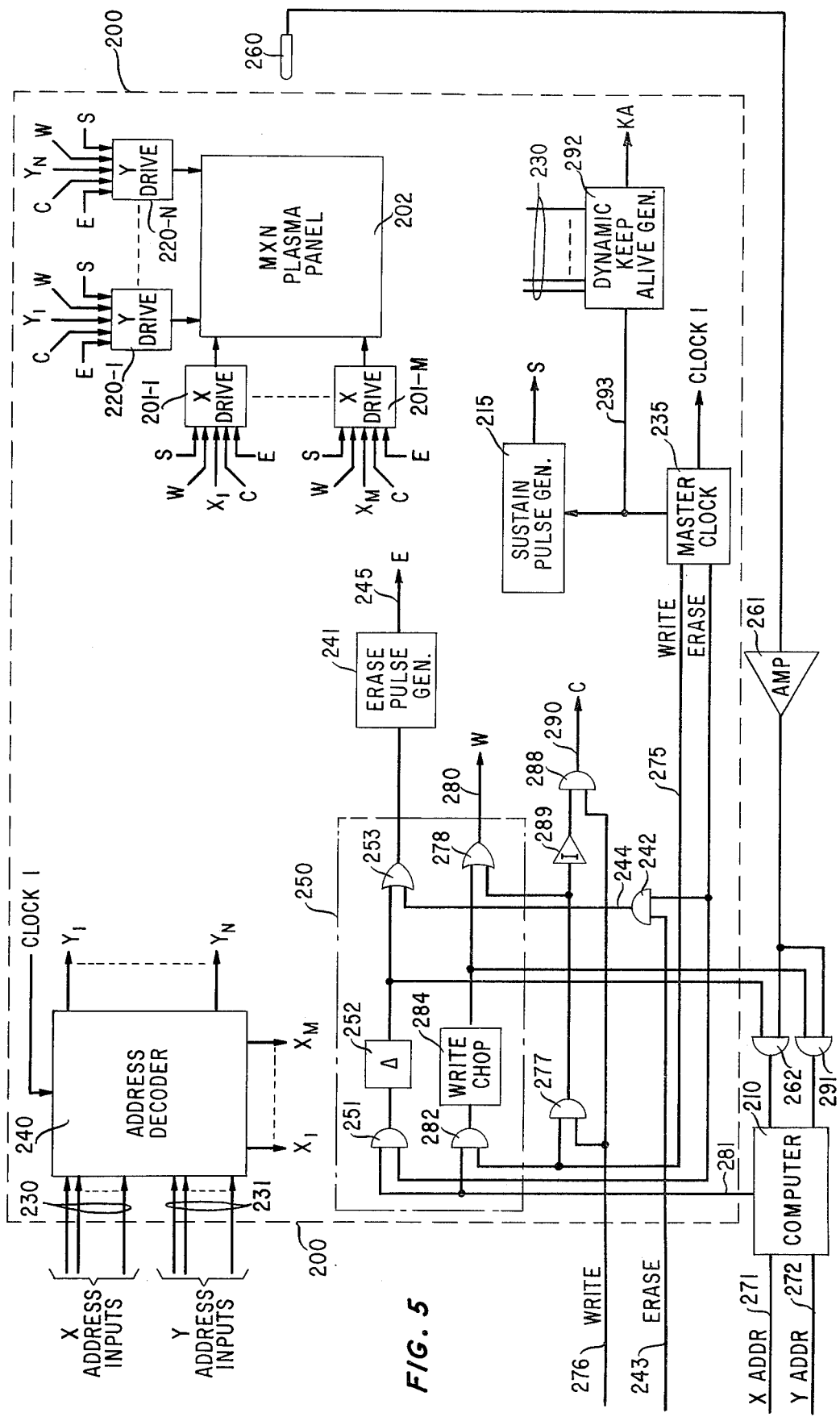
FIG. 5 shows a typical system in accordance with a preferred embodiment of the present invention for generating, applying, detecting and correlating signals associated with light pen use in a plasma panel.

FIG. 5 shows in block diagram form the actual circuitry for accomplishing the functions associated with the waveforms shown in FIGS. 3 and 4 and described above. A plasma display panel 200 is shown which (excepting the portion contained in dashed lines 250) represents functional elements contained in a standard plasma display system of the type described in the Bitzer et al. patent and the Johnson and Schmersal paper, supra. An M by N plasma display panel 202 is seen to have connected to it individual drivers associated with the respective rows and columns of the matrix display. Since the panel is assumed to be of dimensions M by N, there are M row drivers 201-$i$, $i$ = 1, 2, ... M. Similarly, there are N column drivers 220-$j$, $j$ = 1, 2, ... N. Each of the row and column drivers is arranged to provide pulses of magnitude $V_s/2$ for coincidentally accomplishing the sustain function. These drivers are also adapted, in now standard fashion, to superimpose on or modify the sustain pulses by the addition of an E (erase) signal to erase a 1 previously stored in a selected cell. These drivers 201-$i$ and 220-$j$ are also arranged to superimpose an applied write signal W to effect a desired write operation. Individual row and column drivers shown in FIG. 5 are addressed in standard fashion by a select signal indicated by the input $X_i$, $i = 1, 2, \ldots, M$, and $Y_j$, $j = 1, 2, \ldots, N$, as appropriate.

The address inputs to the respective X and Y drivers 201-$i$ and 220-$j$ are, in turn, generated (at a rate of one per sustain cycle) by an address decoder shown as 240 in FIG. 5. The addresses to be decoded are supplied on a plurality of X and Y address inputs shown as 230 and 231, respectively, in FIG. 5. The address selection, of course, is presently relevant only to the generation and application of selectively modified write and erase pulses at the designated address on the plasma panel. In particular the occurrence of a signal on a pair of $X_i$ and $Y_i$ leads and a signal on the associated W and/or E lead causes the delivery of the write and/or erase pulse to the appropriate cell.

The erase pulse appearing on the various E lead inputs of the row and column drivers is, in turn, generated by erase pulse generator 241. The erase pulse generator 241 receives an input signal on lead 243 designated simply as the "erase" lead. The signal on lead 243 is assumed to extend for the duration of an entire sustain cycle, i.e., a duration of T seconds as shown in FIG. 1. The signal on lead 243 then is ANDed with an appropriate clock signal occurring at the normal erase time which is generated by master clock 235. The effect of ANDing the signal on 243 with such a signal from master clock 235 is to supply a pulse on lead 244 beginning at the time that the normal erase pulse interval begins during a sustain cycle. Normally this pulse would pass by way of the lead 244 to erase pulse generator 241, thereby generating on lead 245 the E (erase) pulse.

In accordance with the present invention and my earlier invention described in copending U.S. patent application Ser. No. 345,893 however, an OR circuit 253 is interposed between AND gate 242 and erase pulse generator 241. OR circuit 253 supplies an alternate path for activating erase pulse generator 241. The other input to OR circuit 253 derives from a combination of AND gate 251 and delay circuit 252. As was the case with AND gate 242, AND gate 251 provides an ANDing of the usual erase clock pulse from master clock 235 with a gating signal. In accordance with typical modifications introduced with the invention described in said copending U.S. patent application Ser. No. 345,893, however, the gating signal applied to gate 251 is derived from an input source, assuming the typical form of an external computer as shown in FIG. 5. In operation, then, a pulse derived from computer 210 is applied to AND gate 251 in combination with the normally occurring erase clock pulse from master clock 235. The output from AND gate 251 is, however, delayed by delay circuit 252 before application to OR circuit 253. The overall effect of the operation of the erase circuitry shown in FIG. 5, as modified in accordance with the present invention, is to provide erase pulses occurring at either the normal or a selectively delayed portion of the sustain cycle. As indicated above, such an appropriately delayed erase pulse may be used to advantage in realizing a light pen identification function for on cells in the plasma display panel 202.

As noted above, it is desirable to have the delayed erase pulse be scanned over the entire surface of the plasma display panel to permit identification at an arbitrary on plasma cell. Accordingly, computer 210 is arranged to provide sets of leads represented by leads 271 and 272 with appropriate scanning addresses for application at respective inputs 230 and 231 to address decoder 240 in FIG. 5. When operated in a normal incrementing code, computer 201 supplies a sequence of addresses at T-second intervals to cause each plasma cell on panel 202 to be addressed in turn.

Also shown in FIG. 5 is light pen 260 and associated amplifier 261. These latter entities are used in standard fashion to detect a light pulse occurring adjacent the tip of light pen 260 to signal the computer that a particular location has emitted a light pulse. Computer 210 is conditioned in standard fashion to detect signals indicating the presence of a light pulse during a portion of the sustain cycle corresponding to the occurrence of the delayed erase pulse. This selective detection is made specific in FIG. 5 by the inclusion of AND gate 262 which gates the light pen pulse input with the delayed erase clock signal appearing at the output of delay unit 252. Light pulses occurring at discharges resulting from the normal sustain operation of the plasma panel and light pulses resulting from normal erase (or write) operations are ignored by computer 210.

The descriptions presented thus far with respect to FIG. 5 relate primarily to the on cell detection aspect of the present invention, and are based in large part on the discussion of FIG. 2 of the cited copending U.S. patent application Ser. No. 345,893. Further modifications to standard plasma panel circuitry and operating sequence will now be described. These latter modifications are useful in realizing the scanning erase and dynamic keep-alive functions mentioned above.

The scanning write pulse is derived from the normal write pulse in much the same way as the scanning erase pulse is derived from the normal write pulse. Thus clock circuit 235 provides on lead 275 a clock pulse at the normal write interval, i.e., beginning at $T_{w1}$ and ending at $T_{w2}$ as shown in FIG. 2. When a normal write operation is to take place, the user supplies a logic level write input signal on lead 276 in standard fashion. The signals on leads 275 and 276 are ANDed in AND gate 277 before passing by way of OR circuit 278 to lead 280. Lead 280 is the W lead applied to the respective X and Y drive circuits 201-$i$ and 220-$j$.

The write signal on lead 276 is also used to gate at AND gate 288 an inverted version of the output from AND gate 277. Thus when, at $T_{w2}$, the write signal on lead 275 returns to a low level, causing the output of AND gate 277 to go low, the output of inverter 289 goes high. This causes a positive level to appear on lead 290, the output of AND gate 288, beginning with the end of the normal write clock interval. This lead 290, labeled the C lead, is used to immediately clamp the write signal generated by the X and Y drive circuits 201-$i$ and 220-$j$. The effect of this clamping (which is provided on standard commercial a-c plasma panels) is to provide a sharp trailing edge for the write pulse. Without this clamping, the normal turn-off mechanism associated with the drivers (when connected to the highly capacitive panel electrodes) would be such as to cause a gradually decreasing magnitude for the write pulses. Equivalent clamping is also used in connection with the sustain drivers for the display cell electrodes, but such other clamping is not affected in practicing the present invention.

When operating in the scanning mode, the enabling signal from computer 210 (or other external control source) on lead 281 causes AND gate 282 to pass the write clock pulse on lead 275 to write chop circuit 284.

Write chop circuit 284 functions to generate a shortened version of the standard write pulse beginning, however, at the same point in the sustain cycle as the normal write pulse, i.e., beginning at $T_{w1}$ in FIG. 2. The shortening is effected in one embodiment by simply having the write chop circuit assume the form of a one-shot circuit having an output pulse duration equal to the desired period. The one shot then is responsive to output of AND gate 282 beginning at $T_{w1}$ to generate the shortened pulse. This shortened write pulse is passed by way of OR circuit 278 and the W lead 280 to the X and Y drivers 201-$i$ and 220-$j$.

It should be noted that the write pulse provided on lead 280 in response to a request for a scanned write pulse is not accompanied by a clamp signal on the C lead 280. Thus when the scanned write signal thus supplied on lead 280 is terminated, the X and Y drivers are allowed to switch at a slower speed, thus giving rise to the desired gradually decreasing trailing edge, as shown in FIG. 3.

In further connection with FIG. 3, it should be recalled that the scanning write pulse $e_{sw}$ must be substantially completed wholly within the W' window. Thus when adjusting the period for the pulse issuing from write chop circuit 284, allowance must be made for the eventual slow turn-off of the X and Y drivers. In typical operation the output from write chop circuit 284 is a substantially rectangular pulse having a duration of approximately 1.5 μsec. The resulting scanning write pulse applied to the panel cells by X and Y drivers 201-$i$ and 220-$j$ is then somewhat extended because of the lack of a clamping signal of the type that would occur in a normal writing operation.

AND gate 291 functions in a similar manner to AND gate 262 in gating detected light pulse signals generated in response to the output pulse from the write chop circuit 284. Thus a pulse output from either of gates 262 or 291 indicates that the currently addressed location is in proximity with light pen 260, with an output from 291 indicating that the cell is off and an output from 262 indicating that the cell is on.

DYNAMIC KEEP-ALIVE

Operation of the plasma display panel 202 in FIG. 5 may be enhanced in the normal sustain/write/erase mode using the dynamic keep-alive techniques described in my copending U.S. patent application Ser. No. 460,757 filed April 1974 and incorporated by reference herein. Because such dynamic keep-alive techniques are especially advantageous in connection with scanned write (and erase) pulses of the type described above, the manner of adapting such dynamic keep-alive functions to the system of FIG. 5 will now be described briefly.

Figure 6:
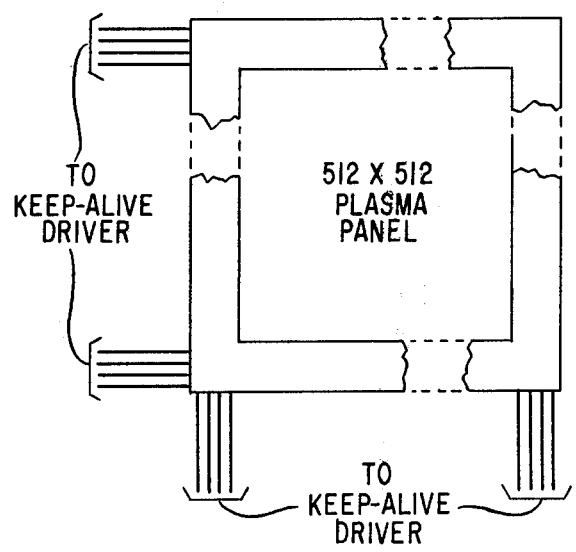
FIG. 6 shows typical keep-alive electrodes on a plasma panel.

FIG. 6 shows a typical plasma panel comprising a 512 × 512 matrix of plasma display cells. Bordering these display cells are bands of so-called keep-alive cells which typically exist in the on state whenever the panel is operating. These keep-alive cells are substantially identical to the display cells, but often operate at a somewhat higher sustain level, $V_{KA}$, than do the normal display cells. In typical prior art systems the keep-alive cells are sustained in synchronism with the display cells, or, in any event, in a time relation to the display cell sustain cycle which is invariant with the location of cells being addressed.

In accordance with my dynamic keep-alive modifications to prior art plasma panel circuitry, the time modifications to prior art plasma panel circuitry, the time of the keep-alive cell sustaining is adjusted to compensate for the relative remoteness of a cell being addressed. In FIG. 5, the keep-alive sustain signals are generated by dynamic keep-alive generator 292. In general, then, all that is required is to selectively modify in dynamic keep-alive generator 292 the time occurrence of the normal keep-alive signals generated by clock 235 on lead 293.

Assuming for simplicity that keep-alive cells are present only along the left and right margins of plasma panel 202, there being none at the top or bottom, the keep-alive sustain time modifications will correspond only to the X coordinate of the current cell being addressed.

One minor difficulty in controlling the exact location of the keep-alive sustain pulses arises from the fact that all cell voltages are derived on a half-select basis. Thus in particular the keep-alive sustain signals are derived in part from row signals and in part from column signals. The column select signals, moreover, are shared in common by the display cells and the keep-alive cells in each column. The display cell sustain signals are not to be time adjusted for particular addresses, however. Thus to obtain an address-dependent keep-alive cell while keeping one half-select component constant requires that the other half-select component be slightly more complex than would otherwise appear to be necessary.

Figure 7:
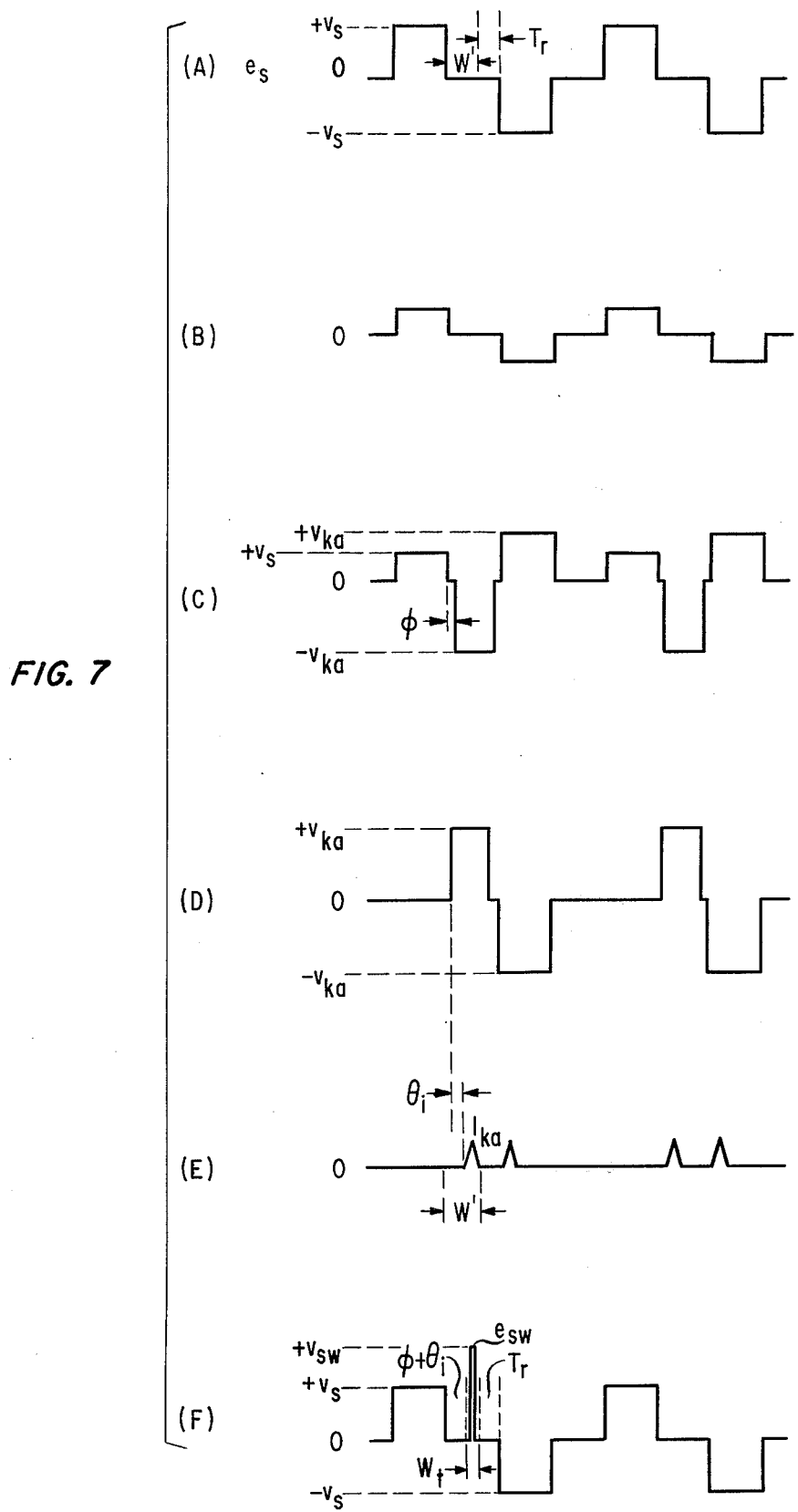
FIG. 7 shows waveforms describing dynamic keep-alive cell operation in accordance with another aspect of the present invention.

In FIG. 7, waveform A shows the desired net sustain voltage for a typical display cell, and waveform B shows the column component of the voltage of waveform A. Waveform C in FIG. 7 shows the other (row) required component so that the desired keep-alive sustain, waveform D, results upon forming the algebraic combination B-C. This combination is performed by the panel structure in standard fashion.

The keep-alive light pulses are shown in waveform E as appearing a characteristic time $\theta_i$ after the beginning of the positive keep-alive pulse in waveform D. The beginning of this positive keep-alive pulse in waveform D occurs an address-dependent time $\phi$ after the completion of the positive column sustain signal in waveform B. Waveform F shows the position of a scanning write pulse, $e_{sw}$, relative to the various other waveforms in FIG. 7.

Figure 8:
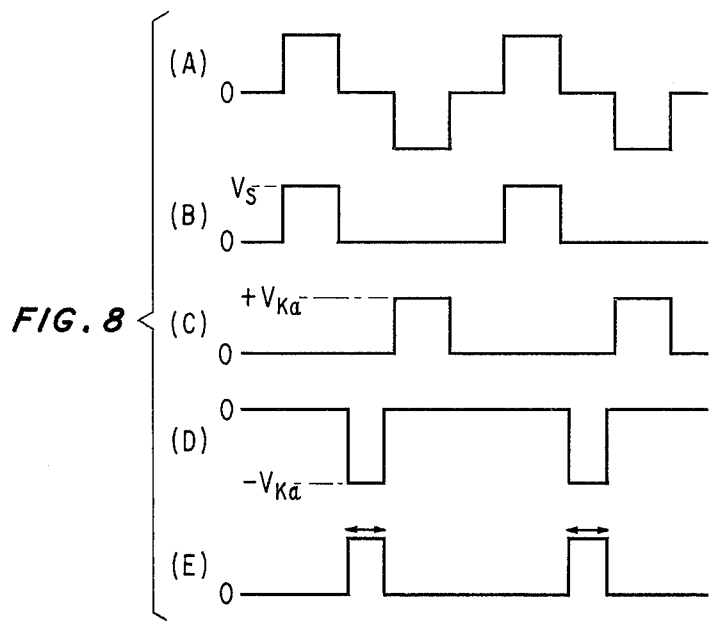
FIG. 8 shows the manner in which components of said keep-alive signals may be combined.

FIG. 8 shows the various components of the keep-alive cell row voltage appearing in waveform C of FIG. 7. In particular, waveform B in FIG. 8 shows the signal of amplitude $V_S$, waveform C shows the waveform with magnitude $V_{ka}$, and waveform D shows the waveform of magnitude $-V_{ka}$. To provide a time reference the normal sustain signal applied to a display cell is shown in waveform A. Each of the waveforms B, C and D in FIG. 8 may, of course, be generated in standard fashion by gating with a clock signal having same timing as the waveforms, B, C and D. Each of the gated signals will of course, have the respective amplitudes indicated in FIG. 8. Gating of fixed level waveforms is precisely the way in which signals are applied to any row or column amplitude in a plasma panel. Thus given that signals of magnitude $\pm V_{ka}$ and $V_S$ are available in a standard commercial panel, all that is required is to generate in straightforward fashion the modified logic level control signals corresponding to the waveforms B, C and D in FIG. 8.

It will be recognized that it is the timing of the component appearing in waveform D in FIG. 8 which is subject to time variation in dependence upon the address of a location being addressed. Thus the logic signal corresponding to the pulses in waveform D are suitably modified in response to the cell address signals. A circuit suitable for this purpose is shown in FIG. 9.

Figure 9:
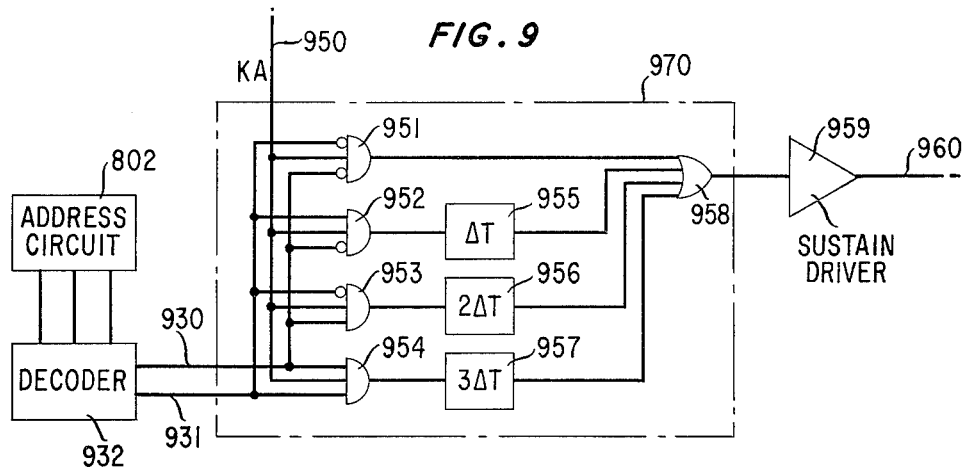
FIG. 9 shows simple circuitry for generating selectively delayed keep-alive signal components in response to applied address signals.
Figure 10:
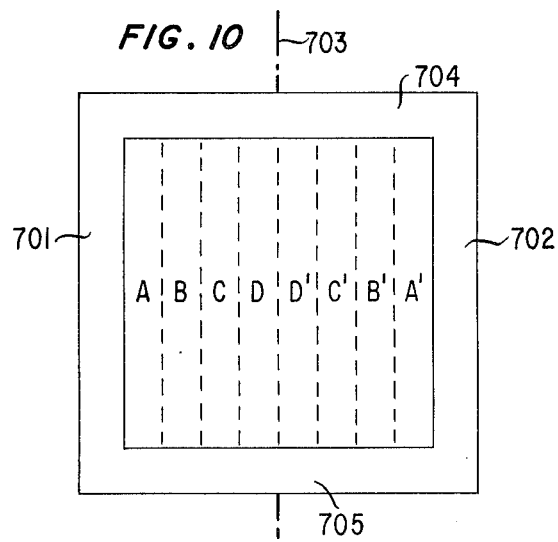
FIG. 10 illustrates typical segments of a plasma panel associated with the typical delays provided by the circuitry of FIG. 9.

The circuit of FIG. 9 is adopted from my earlier U.S. patent application Ser. No. 345,893 filed Mar. 29, 1973, where it appears as FIG. 12. In FIG. 9 a decoder 932 is shown as responsive to signals from address circuit 802. The signals from address circuit 802 correspond to X address inputs for the assumed case of keep-alive cells along the left and right margins only. Decoder 932 examines the three most significant bits of the X address and determines therefrom which of the eight vertical segments shown in FIG. 10 contains the address of the cell about to be accessed. Decoder 932 then provides signals on leads 930 and 931 to select one of the AND gates 951–954, thereby selecting with no delay or a delay of $\Delta T$, $2\Delta T$ or $3\Delta T$. Thus if a clock signal having the form appearing in waveform E in FIG. 8 is applied on lead 950, an appropriately delayed replica of that waveform will form the output of OR circuit 958 suitable for application to sustain driver 959. Sustain driver 959 is, of course, the standard keep-alive driver arranged to gate not only the time-variable $-V_{ka}$ signals to lead 960, but also the fixed-timed $+V_{ka}$ and $V_S$ signals as well.

The above-detailed description has illustrated the manner in which a scanning write pulse may be introduced in a standard plasma panel system both by itself and in connection with a scanning erase pulse. Further the above description has indicated how both scanning pulses may be utilized without giving rise to undesired crosstalk (undesired write or erasing), while maintaining reasonable magnitudes for the respective write/erase and sustain signals. The modifications necessary to a standard plasma panel have been shown to be minimal, while the result obtained greatly enhances the applicability of plasma panel display devices.

While emphasis has been placed on the generation and detection of scanning write and erase pulses in response to applied addresses, it is well now to illustrate the manner in which the addresses may be generated and the output signals from the modified plasma panel utilized to advantage. Initially it is well to consider the functions which are performed by computer 210. It is only necessary that computer 210 provide a continuous sequence of X and Y addresses on leads 271 and 272 for application to sets of input leads 230 and 231, respectively. As is well known, general purpose computers are well adapted for generating continuous sequences of address signals. In fact, this is perhaps the most typical mode of operation for general purpose program computers. That is, it is most common for such computers to access sequentially locations in its internal memory. For this purpose a program of address counter is successively incremented to provide the required sequence of address signals. For purposes of the present invention computer 210 may provide exactly those signals, beginning with an appropriate starting point such as the upper lefthand corner of the plasma panel, by successively incrementing the X location through M values while maintaining the Y address constant at the address for the first row, e.g., at $Y = 1$. This incrementing process for X may then be repeated with a new value of $Y = 2$, etc., until the entire panel is scanned.

Whenever a signal is generated as an output from one of the AND gates 262 or 291 indicating the detection of a write signal during the scanned erase or scanned write interval, respectively, computer 210 may be arranged to provide any of a range of functions. It may only be desired to have the current address (X and Y coordinates) noted in the computer 210, with nothing more taking place immediately. Thus if an image is displayed on the plasma panel corresponding, e.g., to a schematic diagram of an electrical circuit, it may only be required that a particular element, e.g., a resistor, be identified to a program then being executed in computer 210.

In other applications the combination of an output from each one of the gates 262 or 291 and the address signals may be used to modify the image then displayed on plasma panel 202. If, for example, the plasma panel is in a condition where all cells are in the off condition, and the scanned write signal gives rise to a signal at the output of AND gate 291 while the light pen is held adjacent a given location, it is elementary to have the state of the cell thus identified changed to the on condition. For this purpose all that is required is a temporary suspension in the scanning, i.e., incrementing of address signals, while the last address pair is reapplied to the sets of input leads 230 and 231, while also applying a write signal on lead 276. Because the scanning and detection operations occur with such great rapidity, the last-mentioned scanned write detection and cell state modification can take place while an operator is rapidly moving the light pen 260 over the surface of plasma panel 202. The overall effect achieved, then, is to permit writing (by changing off cells to on cells) on the plasma panel. An exactly analogous procedure may of course be followed in connection with an all-on state of the plasma panel cells. Thus upon detection of a particular on cell by a scan erase pulse indicating signal at the output of AND gate 262, it is equally elementary to reapply the then-current address and also an erase signal on lead 243. The effect, then, is to permit an operator to write on the plasma panel by turning off cells adjacent a moving light pen.

A significant advantage of the present invention however, is that by combining both write and erase pulses in a specially timed, specially shaped combination during each sustain cycle, that both on and off cells may be detected and as appropriate, modified.

Other more complex operations by computer 210 are of course possible. The well-known "light button" techniques described, for example, in the above-cited Ninke patent may be adopted for use in connection with the present invention. Thus certain key words may be associated uniquely with subroutines in computer 210. By identifying a location at which these codes (or symbols) are located on the plasma panel 202, execution of the corresponding subroutines in computer 210 may be specified. For example, if a circuit analysis routine is stored in computer 210 and a corresponding designation displayed on plasma panel 202, which panel also may display an electronic or other circuit, it is elementary to have the computer be directed to execute circuit analysis routines with respect to the circuit then displayed on plasma panel 202. Computer 210 must, however, have already stored in it information corresponding to the circuit displayed on plasma panel 202.

Though the dynamic keep-alive feature of the present invention was described with respect to a panel an off cell but having an insufficient duration with respect to its initiation point to store a signal in said selected off cells corresponding to said characteristic level, each of said first flashing signals having the same polarity as the sustain signal initiated immediately before it.

2. A display system comprising
an array of plasma discharge display cells having inherent memory,
means for applying sustain signals to all of said cells in said array, said sustain signals adding to memory signals having at least a characteristic level stored in on cells in said array to cause a glow discharge and an accompanying light signal and to maintain said on cells in an on state, and
means for applying first flashing signals to selected cells in said array thereby to cause a glow discharge and an accompanying light signal to be generated at those of said selected cells which are not in the on state and to cause said selected cells not in the on state to store memory signals having less than said characteristic level,
said means for applying said first flashing signals comprising means for generating pulses having predetermined duration and having a peak magnitude sufficient to cause a glow discharge at an off cell, but which have said peak magnitude for substantially less than all of said predetermined duration, whereby a signal is stored in said selected off cells which is less than said characteristic level.

3. Apparatus according to claim 1 wherein said means for applying first flashing signals further comprises means for sequentially addressing sets of said selected cells in said array.

4. Apparatus according to claim 3 wherein said means for sequentially addressing comprises means for addressing individual cells in said array.

5. A display system comprising
an array of plasma discharge display cells having inherent memory,
means for applying sustain signals to all of said cells in said array, said sustain signals adding to memory signals having at least a characteristic level stored in on cells in said array to cause a glow discharge and an accompanying light signal and to maintain said on cells in an on state, and
means for applying first flashing signals to selected cells in said array thereby to cause a glow discharge and an accompanying light signal to be generated at those of said selected cells which are not in the on state and to cause said selected cells not in the on state to store memory signals having less than said characteristic level,
said means for applying first flashing signals comprising means for sequentially addressing sets of said selected cells in said array and further comprising means for generating and sequentially applying to each of said sets pulses having a peak magnitude sufficient to cause a glow discharge at an off cell, but having said peak magnitude for a period of duration less than is necessary to establish a cell not in the on state in the on state and having a gradually decreasing trailing edge, whereby a signal is stored at each off cell in each of said sets which is less than said characteristic level.

6. Apparatus according to claim 3 further comprising means for generating keep-alive priming signals for each of said sets at a time relative to said first flashing signals which is uniquely related to the address of said sets of cells.

7. Apparatus according to claim 1 further comprising means for generating keep-alive priming signals for each of said selected cells at a time relative to said first flashing signals which is uniquely related to the address of respective selected cells.

8. Apparatus according to claim 1 further comprising means for generating a write signal of predetermined peak magnitude and having a duration suitable to cause a glow discharge at any desired off cell and to cause that off cell to store a signal having at least said characteristic level, and wherein said means for generating signals comprises means for modifying said write signal to have a duration less than said suitable duration.

9. Apparatus according to claim 8 wherein said means for generating said write signal comprises means for clamping said desired cell to a fixed reference level after a predetermined period, thereby providing a sharp termination to said write signal, and wherein said means for modifying comprises means for disabling said means for clamping.

10. Apparatus according to claim 3 further comprising light detecting means for generating a detection signal in response to an adjacent glow discharge, and means for gating said detection signal by a signal approximately contemporaneous with said first flashing signals, thereby to generate a pointing signal indicating that said light detecting means is adjacent a currently addressed set of said selected cells.

11. Apparatus according to claim 10 further comprising means responsive to said pointing signal for applying a write signal to each cell in said currently addressed set to establish each cell in said currently addressed group in the on state.

12. Apparatus according to claim 4 further comprising means for applying second flashing signals to said selected cells in said array, thereby to cause a glow discharge to be generated at those of said selected cells which are in the on state, but to not reduce the magnitude of said memory signals in said on cells below said characteristic level.

13. Apparatus according to claim 12 further comprising means for generating erase signals having a magnitude sufficient to cause a desired on cell to experience a glow discharge accompanied by a depletion of said memory signal previously stored in said desired cell, said erase signals having a duration which is insufficient to cause a memory signal having at least said characteristic level to be restored in said desired on cell, thereby causing said on cell to assume the off state.

14. Apparatus according to claim 13 wherein said means for applying said second flashing signals comprises means for reducing the temporal spacing of said erase signals relative to said sustain signals, thereby to prevent said depletion of said memory signals to proceed to a level less than said characteristic level before being restored by said sustain signals.

15. Apparatus according to claim 12 further comprising light detecting means for generating a detection signal in response to an adjacent glow discharge, means for generating a first pointing signal whenever said detection signal occurs substantially contemporaneously with said first flashing signals, and means for generating a second pointing signal whenever said detection signal occurs substantially contemporaneously with said second flashing signals, said first pointing signal indicating that said light detecting means is adjahaving keep-alive cells only on two sides, obvious modifications in accordance with the teachings of my earlier U.S. patent application Ser. No. 345,893 may be applied to the present invention as well.

In appropriate cases, as where the distance of any display cell from a keep-alive cell is modest, it may not be necessary to incorporate the dynamic keep-alive feature. Further, in appropriate cases the scanned light pulse techniques and circuitry may be used independently of the scanned erase pulse techniques and circuitry.

It should also be clear that alternative means for generating the required sequences of addresses may be used. In particular, separate X and Y counters may have their outputs applied to the inputs 230 and 231, respectively, in FIG. 5. These counters may then be activated and advanced in standard fashion under the control of master clock 235 to generate a new address during each sustain cycle. These addresses may then be applied to computer 210 or other utilization circuitry when a light pen output occurs during the selected scan pulse interval. While not shown, it will occur to those skilled in the art to adjust delay and other time intervals to compensate for propagation delays encountered when computer 210 or other utilization circuitry is physically removed from the immediate vicinity of the display system 200.

Different particular sustain sequences are known in the art. The scanned write and erase pulses shown in the drawing and described above are merely typical. My earlier U.S. patent application Ser. No. 345,893 shows how the erase pulse may be selectively delayed (while being applied in a scanning manner) to permit light pen identification when different particular pulse sequences are used. In each case a delay of $\Delta$ seconds causes the otherwise normal erase pulse to approach the succeeding sustain pulse to within $\tau$ seconds. The same type of relative spacing of scanning write pulses and succeeding sustain pulse of opposite polarity may be used to advantage in detection of off cells in systems having a variety of normal pulse patterns.

In some applications of standard commercial panels, e.g., the normal write pulse is superimposed on at least part of the normal sustain pulse of the same polarity. Thus, in effect, the window, W, shown in FIG. 2 is extended leftward over the positve sustain pulse. This normal write sequence can likewise be modified to perform the scanned write function by chopping the leading edge of the normal write pulse, or delaying it to prevent it from being reinforced sufficiently by the positive sustain pulse. This prevents an actual write from occurring due to a permanent storage of charge at a cell. Again, care must also be taken not to cause a breakdown which can be sustained by the next following negative sustain signal, i.e., the scanned write pulse cannot be shifted to within $T_R$ seconds of the following sustain pulse of opposite polarity.

The present disclosure has proceeded on the assumption that each cell is to be an element for scanning purposes, i.e., each plasma or other cell is scanned separately in sequence. No such limitation is fundamental to the present invention, however. Thus entire rows, columns, quadrants or any other segment of a display surface may be considered as a scanning element using straightforward modifications to the circuitry disclosed. If sufficient program or other logical control can be resorted to, a more efficient scanning involving, e.g., successively smaller areas can be used.

Thus, for example, search procedures of the type described in U.S. Pat. No. 3,651,508 issued Mar. 21, 1972 or U.S. patent application Ser. No. 472,075 filed May 21, 1974 by Ngo and Ninke may be used.

Although the present description has proceeded in terms of the most usual two-state plasma cells, those skilled in the art will recognize the applicability of the present teachings to other than two-state cells, whether plasma cells or other basic light-emitting devices. By simply threshold detecting light pen signals, it is possible to separate signals of varying intensity.

Numerous and various other modifications and adaptations of the present invention within the scope of the appended claims will occur to those skilled in the art.

Because the required additional apparatus is small, the present invention permits the realization of an interactive graphics capability at only a modest increase in complexity over simple display systems. Thus, applications of it in videotelephones and similar systems will be particularly attractive.

Although the present disclosure has proceeded primarily in terms of a plasma discharge display panel, it is clear that many of its features are equally applicable to other display systems having inherent memory or self-memory. For example, a system using the display and memory devices described in U.S. Pat. No. 3,651,493 issued to me on Mar. 21, 1972 may use the present invention to advantage.

Further, though a rectangular array of display cells was used by way of illustration, it should be clear that arrays having other particular shapes with addressable locations may be used. For example, a circular panel having locations defined by polar coordinate values may have utility in some applications.

While the scanned (or flashing) write and scanned erase pulses were illustratively derived from corresponding normal write and erase signals, they may as well be generated by separate pulse generating means in appropriate cases. Similarly, though particular pulse shaping was described for the scanning erase and write signals, different shaping in accordance with the more general teachings contained herein may be used. Thus, e.g., when spurious writing due to sharp-trailing-edge scanned write pulses does not occur, the normal clamp signals may be utilized.

Finally, the terms positive and negative, as describing voltages and charges, e.g., are merely matters of convenient reference. When used consistently, exactly opposite levels may be used. Thus, e.g., a negative write (or scanned write) pulse may be used in connection with a negative sustain pulse just as the corresponding positive pulses have been employed in the description above.

What is claimed is:
1. A display system comprising
an array of plasma discharge display cells having inherent memory,
means for applying alternating polarity sustain signals to all of said cells in said array, said sustain signals adding to memory signals having at least a characteristic level stored in on cells in said array to cause a glow discharge and an accompanying light signal and to maintain said on cells in an on state, and
means operative after the initiation of ones of said sustain signals for applying first flashing signals to selected cells in said array,
said means for applying first flashing signals comprising means for generating signals each having a magnitude sufficient to cause a glow discharge at cent the currently addressed one of said selected cells and said currently addressed cell is in the off state, said second pointing signal indicating that said light detecting means is adjacent the currently addressed one of said selected cells and said currently addressed cell is in the on state.

16. Apparatus according to claim 15 further comprising means responsive to said first pointing signal for establishing said currently addressed cell in the on state.

17. Apparatus according to claim 16 further comprising means responsive to said second pointing signal for establishing said currently addressed cell in the off state.

* * * * *